United States Patent
Chondro

(10) Patent No.: US 12,488,570 B2
(45) Date of Patent: Dec. 2, 2025

(54) OBJECT DETECTION METHOD FOR DETECTING ONE OR MORE OBJECTS USING A PLURALITY OF DEEP CONVOLUTION NEURAL NETWORK LAYERS AND OBJECT DETECTION APPARATUS USING THE SAME METHOD AND NON-TRANSITORY STORAGE MEDIUM THEREOF

(71) Applicant: Industrial Technology Research Institute, Hsinchu (TW)

(72) Inventor: Peter Chondro, Surabaya (ID)

(73) Assignee: Industrial Technology Research Institute, Hsinchu (TW)

( * ) Notice: Subject to any disclaimer, the term of this patent is extended or adjusted under 35 U.S.C. 154(b) by 463 days.

(21) Appl. No.: 17/993,881

(22) Filed: Nov. 24, 2022

(65) Prior Publication Data
US 2024/0177456 A1 May 30, 2024

(51) Int. Cl.
*G06V 20/58* (2022.01)
*G06V 10/25* (2022.01)
(Continued)

(52) U.S. Cl.
CPC ........... *G06V 10/774* (2022.01); *G06V 10/764* (2022.01); *G06V 10/7715* (2022.01); *G06V 10/82* (2022.01); *G06V 20/70* (2022.01)

(58) Field of Classification Search
CPC .............. G06V 10/774; G06V 10/764; G06V 10/7715; G06V 10/82; G06V 20/70; G06V 20/58; G06V 10/25
See application file for complete search history.

(56) References Cited

U.S. PATENT DOCUMENTS 9,495,618 B1 11/2016 Tabb
9,864,932 B2 1/2018 Wu
(Continued)

FOREIGN PATENT DOCUMENTS

| CN | 109977918 | 7/2019 |
| CN | 110880016 | 3/2020 |

(Continued)

OTHER PUBLICATIONS

Wang, Few-shot Adaptive Faster R-CNN, Proceedings of the IEEE/CVF Conference on Computer Vision and Pattern Recognition (CVPR), 2019, pp. 7173-7182 (Year: 2019).*
(Continued)

*Primary Examiner* — Vu Le
*Assistant Examiner* — Lei Zhao
(74) *Attorney, Agent, or Firm* — JCIPRNET

(57) ABSTRACT

According to an exemplary embodiment, the disclosure provides an object detection method includes not limited to obtaining a set of a plurality of object annotated images in a source domain and have a first image style; obtaining a minority set of a plurality of object annotated images in a target domain and having a second image style; obtaining a majority set of a plurality of unannotated images which are in the target domain and having the second image style; performing an image style transfer to generate a converted set of object annotated images having the second image style; generating object annotation for the majority set of the plurality of unannotated images in the second image style to change from the majority set of a plurality of unannotated images into a majority set of a plurality of annotated images; and performing an active domain adaptation to generate an object detection model.

19 Claims, 17 Drawing Sheets

(51) Int. Cl.
*G06V 10/764* (2022.01)
*G06V 10/77* (2022.01)
*G06V 10/774* (2022.01)
*G06V 10/82* (2022.01)
*G06V 20/70* (2022.01)

(56) References Cited

U.S. PATENT DOCUMENTS

| | | |
|---|---|---|
| 2016/0307069 A1 | 10/2016 | Wu |
| 2018/0373999 A1 | 12/2018 | Xu |
| 2020/0134379 A1 | 4/2020 | Gaidon et al. |
| 2020/0257984 A1 | 8/2020 | Vahdat et al. |
| 2020/0327338 A1 | 10/2020 | Philion et al. |
| 2021/0312232 A1 | 10/2021 | Tensmeyer et al. |

FOREIGN PATENT DOCUMENTS

| | | |
|---|---|---|
| CN | 111461048 | 7/2020 |
| CN | 113313178 | 8/2021 |
| CN | 113469190 | 10/2021 |
| TW | 202117666 | 5/2021 |
| TW | 202211167 | 3/2022 |
| WO | 2022099425 | 5/2022 |

OTHER PUBLICATIONS

Wu, Entropy Minimization vs. Diversity Maximization for Domain Adaptation, arXiv:2002.01690v1 [cs.LG] Feb. 5, 2020 (Year: 2020).*

Vanstorm9, How do I resample dataset with data augmentation to make dataloader larger?, PyTorch Forums, Aug. 2021 (Year: 2021).*

Dong, Unsupervised Image-to-Image Translation with Generative Adversarial Networks, arXiv:1701.02676v1 [cs.CV] Jan. 10, 2017 (Year: 2017).*

Chen, Iosuda: an unsupervised domain adaptation with input and output space alignment for joint optic disc and cup segmentation, Applied Intelligence (2021) 51:3880-3898 (Year: 2021).*

Qi, CA-SSL: Class-Agnostic Semi-Supervised Learning for Detection and Segmentation, Computer Vision—ECCV 2022, 17th European Conference, Tel Aviv, Israel, Oct. 23-27, 2022 (Year: 2022).*

Liu, Few-Shot Image Classification: Current Status and Research Trends, Electronics 2022, 11, 1752. https://doi.org/10.3390/electronics11111752, Published: May 31, 2022 (Year: 2022).*

Niu, Multi-Modal Multi-Scale Deep Learning for Large-Scale Image Annotation, IEEE Transactions on Image Processing, vol. 28, No. 4, Apr. 2019 (Year: 2019).*

"Office Action of Taiwan Counterpart Application", issued on Jun. 7, 2023, p. 1-p. 8.

Joseph Redmon et al., "You Only Look Once: Unified, Real-Time Object Detection", 2016 IEEE Conference on Computer Vision and Pattern Recognition, May 9, 2016, pp. 779-788.

Wei Liu et al., "SSD: Single Shot MultiBox Detector", Springer International Publishing AG 2016, B. Leibe et al. (Eds.): Springer European Conference on Computer Vision 2016, Part I, LNCS 9905, Sep. 17, 2016, pp. 21-37.

Marius Cordts et al., "The Cityscapes Dataset for Semantic Urban Scene Understanding", 2016 IEEE Conference on Computer Vision and Pattern Recognition, Apr. 7, 2016, pp. 3213-3223.

Shai Ben-David et al., "Analysis of Representations for Domain Adaptation", Advances in Neural Information Processing System, Dec. 4, 2006, pp. 137-144.

Shai Ben-David et al., "A theory of learning from different domains", Machine Learning, vol. 79, No. 1, May 2010, pp. 151-175.

Ozan Sener et al., "Active Learning for Convolutional Neural Networks: a Core-Set Approach", 6th International Conference on Learning Representations (ICLR 2018), Jun. 1, 2018, pp. 1-13.

Andreas Kirsch et al., "BatchBALD: Efficient and Diverse Batch Acquisition for Deep Bayesian Active Learning", 33rd Conference on Neural Information Processing Systems (NeurIPS 2019), Oct. 28, 2019, pp. 7026-7037.

Yaniv Ovadia et al., "Can You Trust Your Model's Uncertainty? Evaluating Predictive Uncertainty Under Dataset Shift", 33rd Conference on Neural Information Processing Systems (NeurIPS 2019), Dec. 8, 2019, pp. 1-12.

Fan Zhou et al., "Discriminative active learning for domain adaptation", Knowledge-Based Systems, vol. 222, Mar. 26, 2021, pp. 1-10.

Tsung-Yi Lin et al., "Focal Loss for Dense Object Detection", 2017 IEEE International Conference on Computer Vision, Feb. 7, 2018, pp. 2999-3007.

* cited by examiner

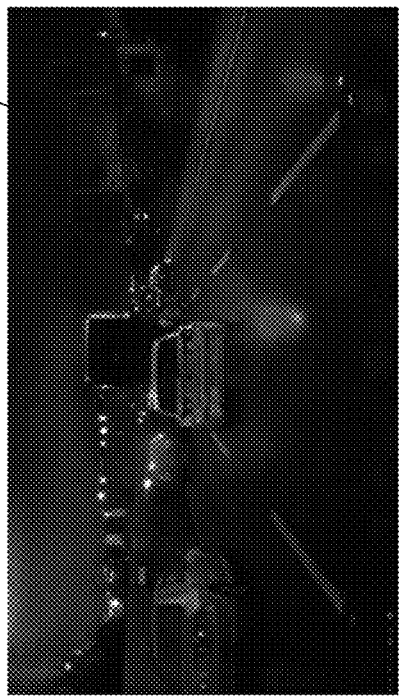
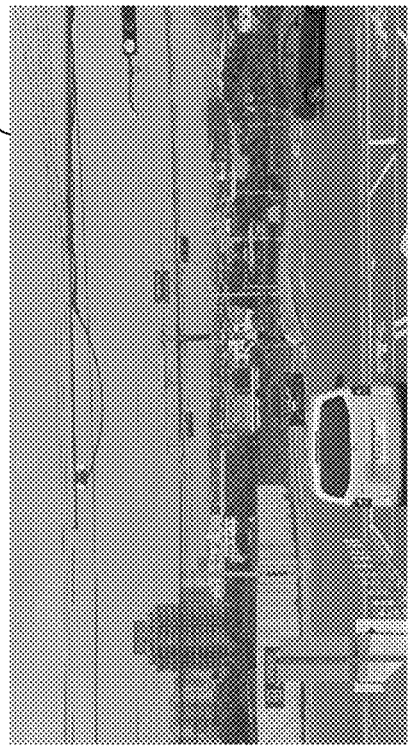
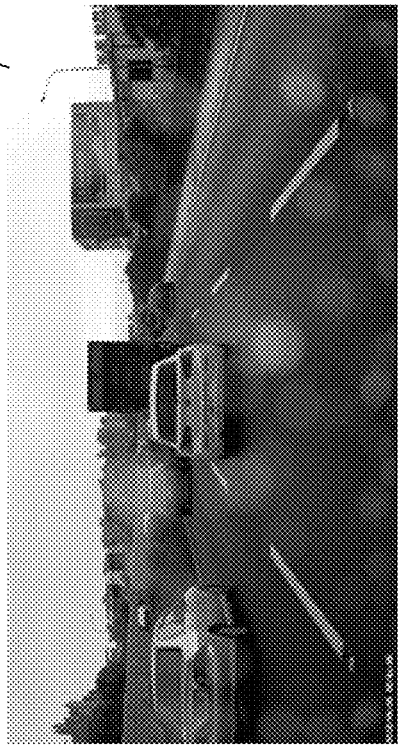
FIG. 1

$$I(u,v) = \sum_{x,y=0}^{3} a_{xy} I_l(u^x, v^y)$$

| | Proposed | Baseline |
|---|---|---|
| Type | Active Domain Adaptation | Conservative Learning |
| Framework | DarkNet @ 100,000 iterations | |
| Architecture | Encoder-Decoder Architecture (ITRI-DriveNet) | |
| Resolution | $W_M = 416$ \| $H_M = 256$ | |
| Classes | 4 Classes (Pedestrian, Rider, Two-wheels, Four-wheels) | |
| Result Type | Object Bounding Box | |
| Manual Annotations | Train | 12,384 frames | 24,768 frames |
| | Validation | 4,580 frames | 4,580 frames |
| Hardware | CPU 3.0GHz Intel i5-8500 – RAM 16GB – GPU NVidia GTX1070 8GB – HDD 4.5TB | |
| Software | Ubuntu 16.04 LTS – CUDA 10.0 – CuDNN 7.4.2 – Python 3 | |

FIG. 17

OBJECT DETECTION METHOD FOR DETECTING ONE OR MORE OBJECTS USING A PLURALITY OF DEEP CONVOLUTION NEURAL NETWORK LAYERS AND OBJECT DETECTION APPARATUS USING THE SAME METHOD AND NON-TRANSITORY STORAGE MEDIUM THEREOF

TECHNICAL FIELD

The disclosure is directed to an object detection method for detecting one or more objects using a plurality of deep convolution neural layers, an object detection apparatus using the same method, and a non-transitory storage medium thereof.

BACKGROUND

In the development of the autonomous vehicles, reliable and efficient object detection has been an important endeavor of recent years. One way to perform object detection is to rely on deep convolution neural network (DNN) architecture, of which vast sets of adjustable weights could be estimated through a fully-supervised model training. However, typical training schemes may require a large amount of manually labeled datasets which may cause inefficient model adaptations across different data domains. The data domain may include an extensive variety of domains such as domains as results of different sensor modalities, different regions of recording, different weather conditions, different color tones (associated with the time of day), different sensor field of views, different sensor layouts, and etc.

FIG. 1 shows an example of datasets across different data domains for training. In FIG. 1, images 101 and 102 have different color tones which are associated with different day and night conditions. Further, images 103 and 104 are associated with different object distances and capturing angles. In general, domain transfers could be done between a source domain into a target domain. For example, images 101 and 103 could be source domain images and images 102 and 104 could be target domain images. Source domain and target domain are essentially images with distinctive image style with different variations, content, and/or features. Thus, a different image style could be thought of as a different weather, different times of the day, a different environment, a different sensor layout, and etc.

Through a conservative model training, a DNN architecture is expected to perform well under a variety of data domains that have been included inside the corresponding training/validation dataset (this includes both manually-labeled data and augmented data). This could be accomplished by considering condition varieties which are to be modeled into a DNN architecture. Incorporating condition varieties in a DNN architecture would lead to domain varieties. In practice, domain varieties that could be included in a training or validation dataset would likely be adjusted to conform with the domain varieties of the testing dataset to optimize the modeling of a DNN architecture. This domain-specific model implies a challenge in transferring model knowledge into a target domain, which would like require an exhaustive amount of labeled dataset of the target domain.

Preparing an exhaustive labeled dataset of the target domain would require quantitatively high resources, which could be a hindrance to the adaptation effort of the DNN architecture. For example, the average elapsed time for a labeler to annotate an image of a driving scene, such as a cityscapes dataset could take up to approximately 90 minutes. Motivated by this reason, a domain adaptation technique that transfers knowledge from an existing domain-specific model to a target domain without utilizing the entirety of the required labeled dataset of the target domain as supposed in a conservative learning approach could be an appropriate solution.

Contrary to the conservative approach, active domain adaptation is an atypical supervised learning with a minority of a labeled dataset, which was carefully curated according to its significance to the corresponding model training. By downsizing insignificant data, quintessential data labels could be identified in order to eliminate any effort to label unnecessary data and to use them during model training. The determination of data significance could be provided based on feature diversity that emphasizes data significance by maintaining large diversities of target data labels based on feature-wise distances. However, the selection of target data labels with distant feature-space distribution from source data labels might lead to some consequences including outlier data or a biased model. One instance of a biased model is the failure to detect high-confident but erroneous objects within a target image. Moreover, the survey of data labels within the feature space to acquire distances for its feature diversity might not be the most efficient method.

SUMMARY OF THE DISCLOSURE

Accordingly, the disclosure is directed to an object detection method for detecting one or more objects using a plurality of deep convolution neural network (DNN) layers, an object detection apparatus using the same method, and a non-transitory storage medium thereof.

According to an exemplary embodiment, the object detection method of the disclosure includes not limited to obtaining a set of a plurality of object annotated images which are in a source domain and have a first image style; obtaining a minority set of a plurality of object annotated images which are in a target domain and having a second image style; obtaining a majority set of a plurality of unannotated images which are in the target domain and having the second image style; performing an image style transfer from the source domain to the target domain by converting the plurality of object annotated images in the source domain from having the first image style into having the second image style to generate a converted set of object annotated images having the second image style; generating object annotation for the majority set of the plurality of unannotated images in the second image style based on the converted set of object annotated images in the second image style and the minority set of the plurality of object annotated images in the second image style to change from the majority set of a plurality of unannotated images into a majority set of a plurality of annotated images; and performing an active domain adaptation by adapting the minority set of a plurality of object annotated images, the converted set of object annotated images, and the majority set of the plurality of annotated images so as to generate an object detection model.

In one of the exemplary embodiments, the disclosure is directed to an object detection apparatus. The object detection apparatus of the disclosure includes not limited to a storage device and a processor electrically connected to the storage device and configured at least to: obtain a set of a plurality of object annotated images which are in a source domain and have a first image style; obtain a minority set of a plurality of object annotated images which are in a target domain and having a second image style; obtain a majority set of a plurality of unannotated images which are in the target domain and having the second image style; performing an image style transfer from the source domain to the target domain by converting the plurality of object annotated images in the source domain from having the first image style into having the second image style to generate a converted set of object annotated images having the second image style; generate object annotation for the majority set of the plurality of unannotated images in the second image style based on the converted set of object annotated images in the second image style and the minority set of the plurality of object annotated images in the second image style to change from the majority set of a plurality of unannotated images into a majority set of a plurality of annotated images; and perform an active domain adaptation by adapting the minority set of a plurality of object annotated images, the converted set of object annotated images, and the majority set of the plurality of annotated images so as to generate an object detection model.

In one of the exemplary embodiments, the disclosure is directed to a non-transitory storage medium which stores computer readable program loaded into a processor of a computer to control the computer to perform functions including not limited to: obtaining a set of a plurality of object annotated images which are in a source domain and have a first image style; obtaining a minority set of a plurality of object annotated images which are in a target domain and having a second image style; obtaining a majority set of a plurality of unannotated images which are in the target domain and having the second image style; performing an image style transfer from the source domain to the target domain by converting the plurality of object annotated images in the source domain from having the first image style into having the second image style to generate a converted set of object annotated images having the second image style; generating object annotation for the majority set of the plurality of unannotated images in the second image style based on the converted set of object annotated images in the second image style and the minority set of the plurality of object annotated images in the second image style to change from the majority set of a plurality of unannotated images into a majority set of a plurality of annotated images; and performing an active domain adaptation by adapting the minority set of a plurality of object annotated images, the converted set of object annotated images, and the majority set of the plurality of annotated images so as to generate an object detection model.

It should be understood, however, that this summary may not contain all of the aspect and embodiments of the disclosure and is therefore not meant to be limiting or restrictive in any manner. Also the disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 1 illustrates an example of datasets across different data domains for training.

FIG. 17 illustrates a comparison of Environment Specifications between this present disclosure and a baseline.

DETAILED DESCRIPTION OF DISCLOSED EMBODIMENTS

Figure 2:
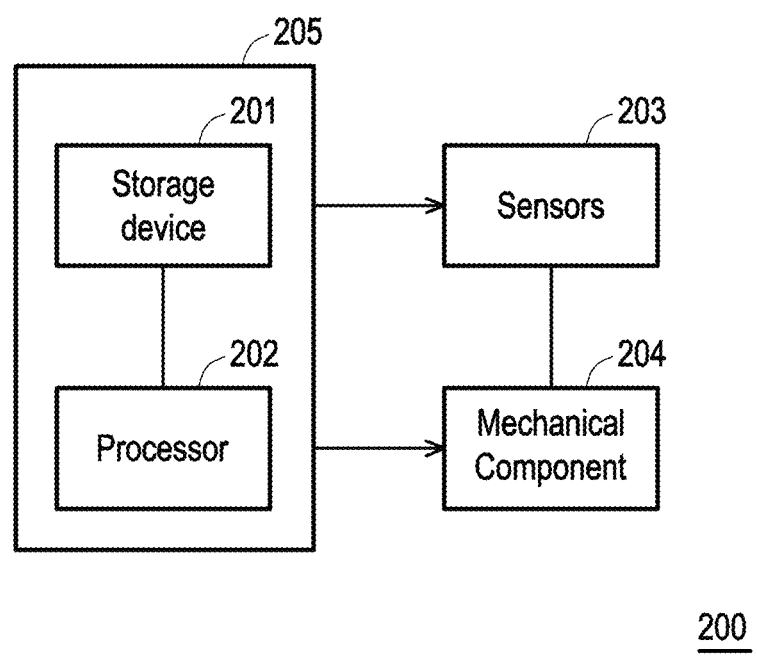
FIG. 2 illustrates a hardware block diagram of an object detection apparatus according to an exemplary embodiment of the disclosure.

Reference will now be made in detail to the present exemplary embodiments of the disclosure, examples of which are illustrated in the accompanying drawings. Wherever possible, the same reference numbers are used in the drawings and the description to refer to the same or like parts.

The disclosure provides a model training technique for performing real time object detection based on a DNN architecture. The disclosure is able to improve upon the state-of-the-art image processing technology by expediting the transfers of image domain data between domain-specific models from a source domain to a target domain while achieving significant resource reductions required for manually labeling datasets over the target domain when comparing to a known conservative approach. Consequently, the proposed framework is able to accelerate the adaptation of an object detection model when deploying such model to an environment of the target domain that is perceptually different from the environment of its corresponding source domain.

For instance, an object detection model could be trained based on traffic conditions in Germany, the source domain, to detect pedestrians and vehicles. If the same object detection model is deployed into a test environment based on traffic conditions in Taiwan, the target domain, the same object detection model would likely less accurate despite the actual objects that are subject to detections being very similar. This phenomenon is mostly attributed to the incapability of the object detection model to detect variants of a class in the target domain. The variants could be attributed to the weather, amount of light, background differences, and etc. The disclosure aims provide an improved model training technique so that an object detection model trained at a location could be deployed to different locations by effectively adapting to different domains.

FIG. 2 illustrates a hardware block diagram of an object detection apparatus according to an exemplary embodiment of the disclosure. The object detection apparatus 200 may include not limited to a computer system 205 which includes not limited to a processor 202 and a storage device 201. The storage device 201 may include one or more volatile storage device which temporarily store computer data such as a buffer memory, random access memory (RAM), and etc. The storage device 201 may include one or more non-volatile storage device which stores programming codes or more permanent computer data such as hard drives, flash memory, read-only-memory (ROM), and etc. The storage device 201 is electrically connected to a processor 202 which controls the computer system 205 to implement the functions described in the object detection method of FIG. 3 and in subsequent disclosures. The processor 202 could be a graphics processing unit (GPU), a central processing unit (CPU), a micro-controller, a field programmable gate array (FPGA), a custom integrated circuit (IC), and etc.

The computer system 205 could be deployed into the object detection apparatus 200 such as a motor vehicle, a robot, a ship, a drone, an air craft, and etc. The object detection apparatus 200 may include not limited to image sensors 203 for capturing images containing objects to be detected and the rest of mechanical components associated with the object detection apparatus 200. The image sensors could be passive image sensors such as a camera having a specified frame rate and field of view.

Figure 3:
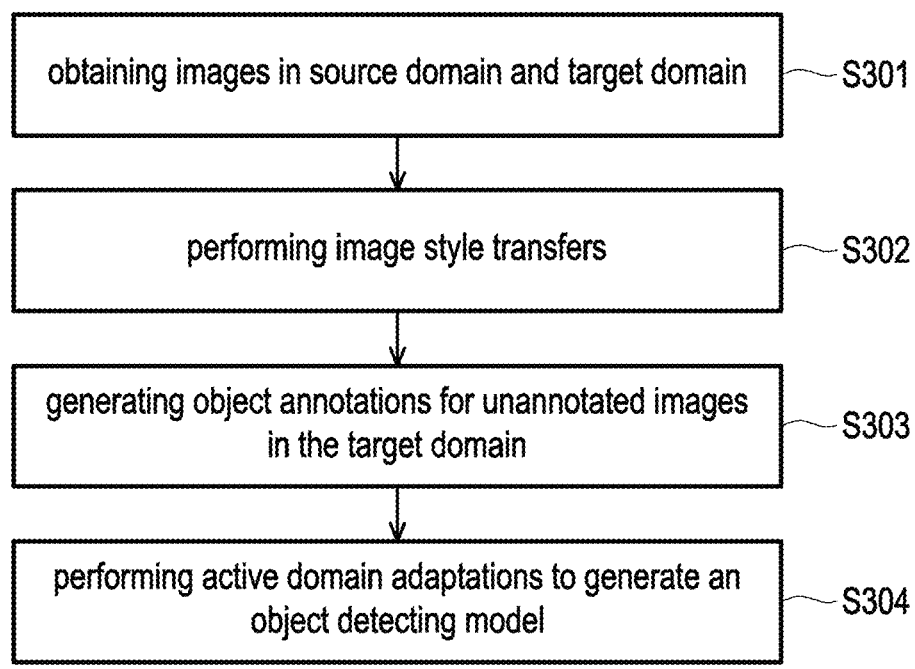
FIG. 3 illustrates an object detection method for detecting one or more objects in an image according to an exemplary embodiment of the disclosure.

FIG. 3 illustrates an object detection method for detecting one or more objects in an image according to an exemplary embodiment of the disclosure. Referring to FIG. 3, in step S301, the object detection apparatus 200 would obtain images by obtaining a set of a plurality of object annotated images which are in a source domain and have a first image style; obtaining a minority set of a plurality of object annotated images which are in a target domain and having a second image style; obtaining a majority set of a plurality of unannotated images which are in the target domain and having the second image style. In step S302, the object detection apparatus 200 would perform image style transfers including performing an image style transfer from the source domain to the target domain by converting the plurality of object annotated images in the source domain from having the first image style into having the second image style to generate a converted set of object annotated images having the second image style. In step S303, the object detection apparatus 200 would perform generating object annotations for the majority set of the plurality of unannotated images in the second image style based on the converted set of object annotated images in the second image style and the minority set of the plurality of object annotated images in the second image style to change from the majority set of a plurality of unannotated images into a majority set of a plurality of annotated images. In step S304, the object detection apparatus 200 would perform an active domain adaptation by adapting the minority set of a plurality of object annotated images, the converted set of object annotated images, and the majority set of the plurality of annotated images so as to generate an object detection model.

To be more plainly, the object detection model would perform the image style transfer for a set of images in the source domain and a corresponding set of images in the target domain. Each image of the set of images in the source domain is paired with a corresponding image in the set of images in the target domain. The pair of images that are corresponding could be similar or the same type of object(s) that is/are subject to detection, but the each of the pairs of images has a different image style from each other. For example, the objects could be two different sedans, and the sedans do not have to be the same brand. Different image styles may refer to different environment, different locations, different camera angles, different camera distances, different time of the day, different lighting conditions, and so forth. Further, even though an image in the source domain is paired with a corresponding image in the target domain, the total number of images in the source domain does not have to be the same as the total number of images in the target domain. For example, assuming that the total number of images in the target domain is less than the total number of images in the source domain, an image in the target domain could be duplicated from nearby frames so that the total number of images in the source domain to be used for image style transfer may become identical to the total number of images in the target domain.

Among the images procured in step S301, the images may include a set of multiple images that are already labelled or annotated with objects such as bounding boxes or other objects that serve the similar purposes from the bounding boxes from the source domain and have an image style of the source domain, a minority set of multiple images which are that are already labelled or annotated in the target domain and having an image style of the target domain, and a majority set of multiple unannotated images which not labelled nor annotated in the target domain and having the image style of the target domain. The image style of the source domain (e.g. first image style) and the image style of the target domain (e.g. second image style) are different image styles. "minority" means less than 50% of the total images in the target domain, and "majority" means more than 50% of the total images in the target domain. To be plainly, most of the images used for training in the target domain are not annotated nor labelled. The annotations or labels for a minority set of multiple images which are that are already labelled or annotated in the target domain could have been performed manually.

After procuring the images as described in step S301, the object detection apparatus would perform image style transfers by converting the already annotated images from the source domain from having the image style of the source domain into converted images having the image style of the target domain. Next, the object detection apparatus 200 would generate object annotations or labels (e.g. bounding boxes) for the mostly unannotated images in the image style of the target domain based on the converted images having the image style of the target domain and the minority set of the images from the target domain that are already labelled. Next the object detection apparatus 200 would perform an active domain adaptation by adapting the minority set of already annotated images from the target domain, the converted images having the image style of the target domain, and labelled images from the target domain. Lastly, the object detection model is generated when the training session has been completed.

As the result of the disclosure, one of the main improvements of the disclosure is that the percentage of the already labelled images from the target domain that are needed for training would be less than the conventional state of the art technology while minimizing the impacts of the trade-offs between the amount of already labeled images from target domain and the accuracy of the object detection model.

Figure 4:
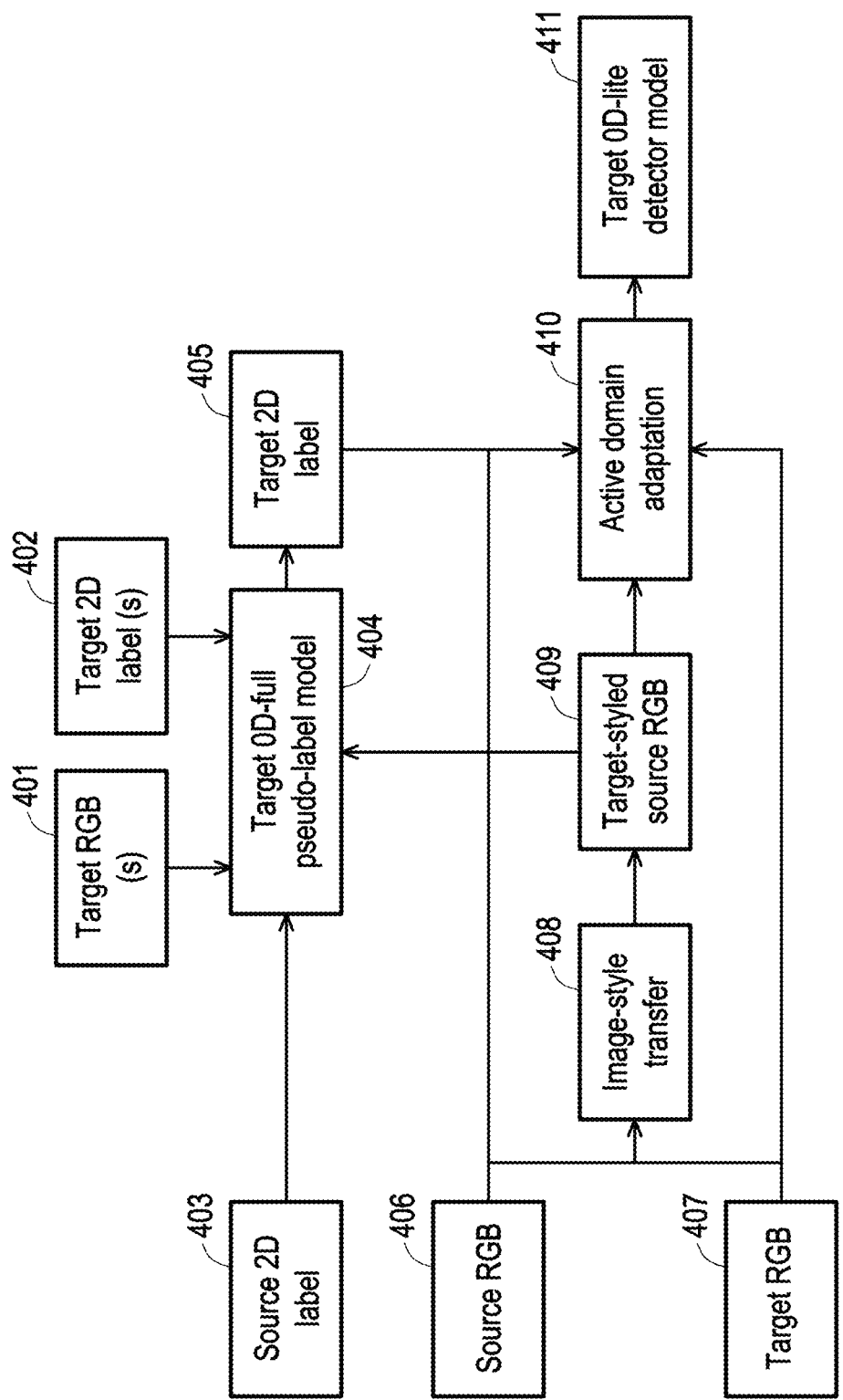
FIG. 4 illustrates a flow chart that describes a technique of training an object detection model according to an exemplary embodiment of the disclosure.

To further elucidate the inventive concepts as previously described, the disclosure further provides several exemplary embodiments which explains the inventive concepts in further details. FIG. 4 illustrates a flow chart that describes various functional blocks involved in training an object detection model according to an exemplary embodiment of the disclosure. The functional blocks of FIG. 4 could be realized as software executed by the processor 202 or could be implemented as an individual IC or a combination of both. The process described in FIG. 4 includes an image style transfer network 408 and a two-stage detector which includes a pseudo-labeler 404 and a main detector 411. The image transfer style network 408 would receive a set of images from the source domain 406 and a set of unannotated images from the target domain 407. The image style transfer network 408 would transfer each image style of the set of images of the source domain 406 into each corresponding image styles of the set of unannotated images of the target domain 407 according to the perceived characteristics of the target domain. The image style transfer network includes an encoder-decoder architecture with unsupervised learning to convert image styles of each of the images from the source domain into the image style styles of the target domain. In other words, the image style transfer network 408 is aimed to convert annotated images having image styles of the source domain into converted annotated images having image styles of the target domain 409 so as to train pairs of images from the source domain and the target domain. Further details related to the image style transfer network is to be provided in the subsequent disclosure.

The pseudo-labeler 404 would receive the annotated images having image styles of the target domain 409, the annotations from each of the images from the source domain 403, the images from the target domain 401, the annotations from each of the minority of images from the target domain 402 so as to generate annotations for the majority of images from the target domain 405. The pseudo-labeler 404 essentially acts as the first stage detector that could be trained based on converted images from the source domain taking on styles of the images of the target domain so as to generate annotations for the rest of the unannotated images from the target domain.

The active domain adaptation module 410 would perform an active domain adaptation by adapting the minority set of the annotated images of the source domain 306, the converted annotated images having image styles of the target domain 409, and the majority set of the unannotated images 407 so as to output image data to train the main detector 411. The main detector 411 would act as the second stage detector that could be trained by the active domain adaptation module 410. In addition to training the main detector 411 based the active domain adaptation module, the training of the main detector 411 may further based on a dynamic scheduling policy that would moderate diversity-driven gradients against model uncertainties and class imbalances. Other common learning measures are also integrated to maximize the model's potential including focal loss and class-weighted loss. Each of the architecture of the pseudo-labeler 404 and the main detector 411 architecture include a backbone layer and a prediction layer. Further details related to the pseudo-labeler 404 and the main detector 411 is to be provided in the subsequent disclosure.

Figure 5:
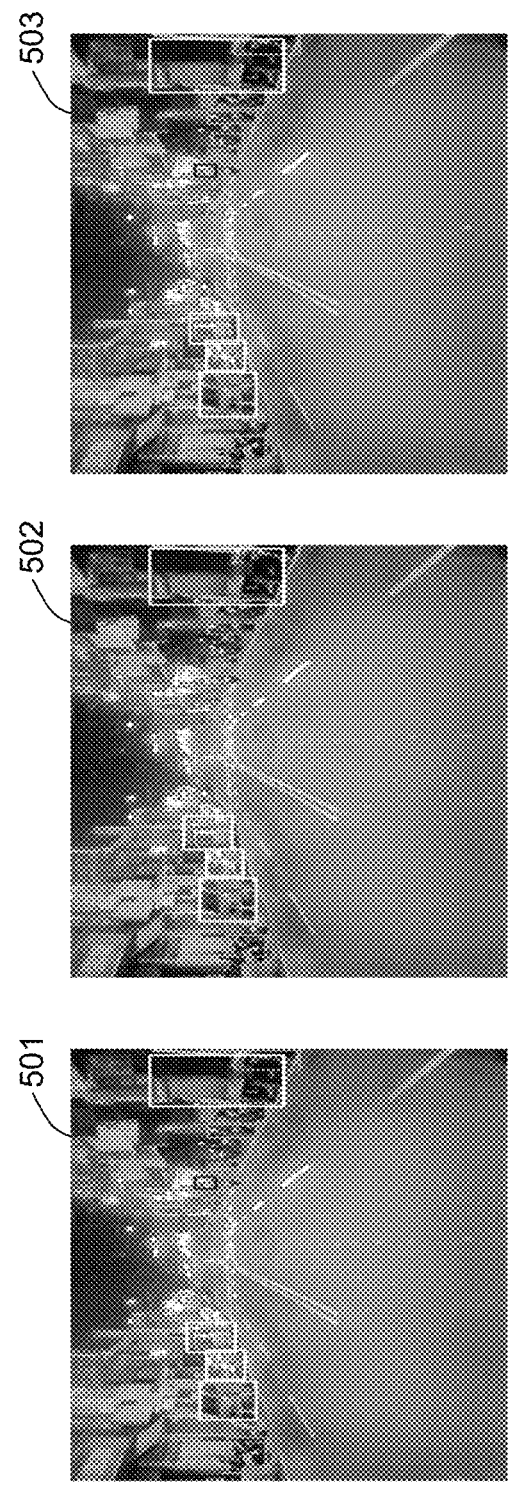
FIG. 5 illustrates a comparison of characteristics between the framework of the disclosure and other AI model training frameworks.

FIG. 5 illustrates a comparison of characteristics between the framework of the disclosure and a conservative AI model training framework. Image 501 illustrates the result of a conservative model training by using a set of images from the target domain that are entirely annotated or labeled. Image 502 illustrates the result of a conservative model training by using a set of images from the target domain, and half of the set of images are annotated or labeled. Image 503 illustrates the result of the model training of the disclosure by using a set of images from the target domain, and half of the set of images are annotated or labeled. It could be seen from FIG. 5 that image 503 has at least the same accuracy as image 501.

Figure 6:
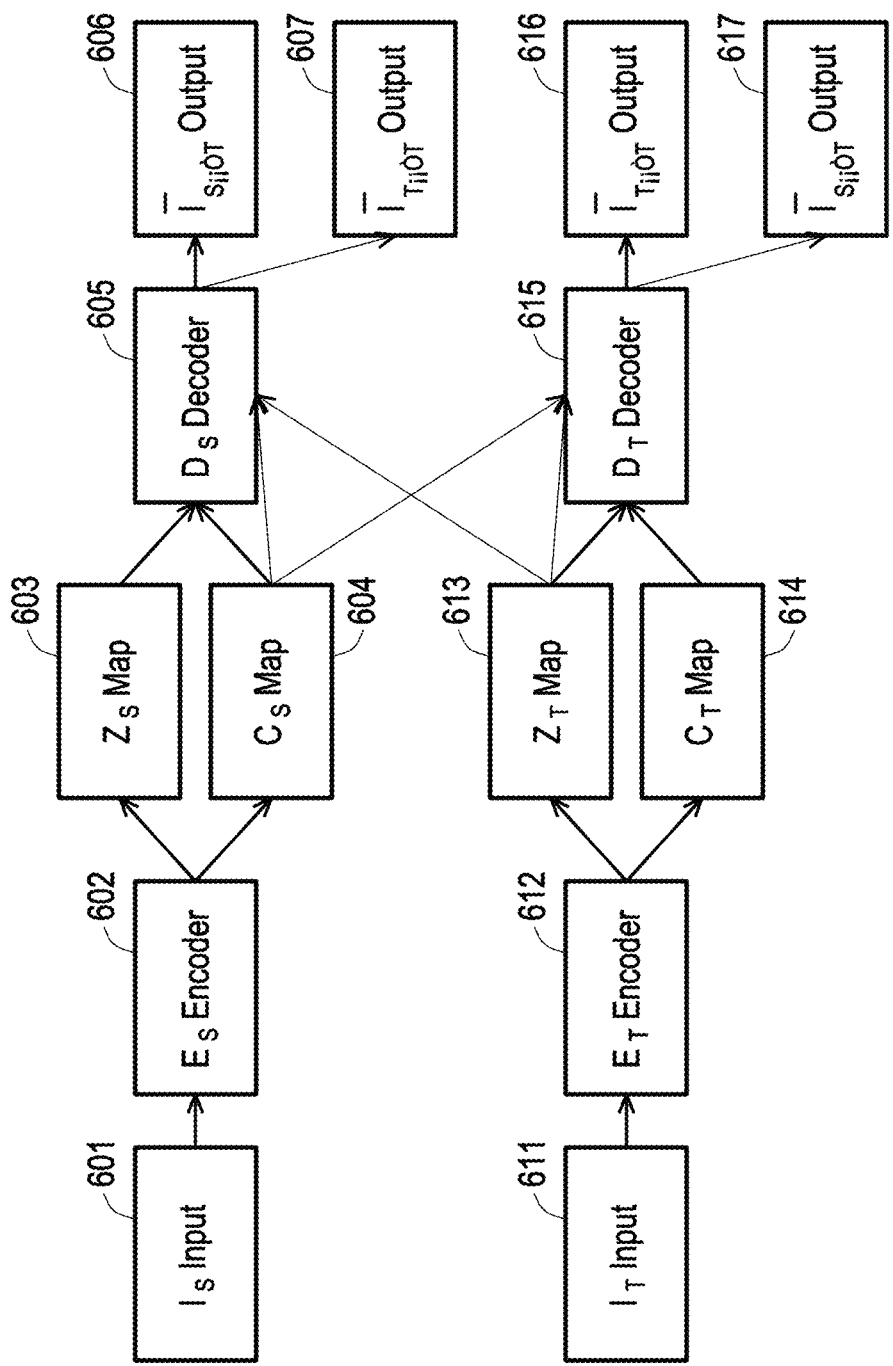
FIG. 6 illustrates a flow chart that describes a technique of performing an image-style transfer according to an exemplary embodiment of the disclosure.

FIG. 6 illustrates a flow chart that describes a process of an image-style transfer performed by an image style transfer network according to an exemplary embodiment of the disclosure. Before performing the active domain adaptation by the active domain adaptation module 410 to implement a two-stage detector training, data pre-processing could be performed with the aim to transfer the image styles of the images of the source domain into the image styles of the images of the target domain. This data pre-processing is colloquially represented by the image-style transfer network 408, which is fundamentally a generative adversarial network with unsupervised data training from pairs of unlabeled datasets, each of the pairs includes an unlabeled or unannotated image from the source domain and an unlabeled or unannotated image from the target domain.

Image-style transfer network 308 assumes that an image includes two space features, namely, content features and style features. Content features are any image properties or derivatives that are correlating with objects or certain environments inside the corresponding image. For instance, from an image recorder inside a vehicle or a robot, the environment could be constructed as a representation of a land area (i.e. road) and a representation of an azure. Style features are any image properties of derivatives that are correlating with how the image is being represented. For instance, in an automobile DVR, the image style could be a clear afternoon, a clear evening, a rainy afternoon, or a rainy evening. For this embodiment, the image-style transfer network 308 would focus on the style features and assumes constant content features.

The network architecture of said the image-style transfer network of FIG. 6 is mostly a generator that includes a set of encoders $E_d$ (e.g. 602 612) and a set of decoders $D_d$, (e.g. 605 615) wherein d represents the domain index including source domain S and target domain T. Thus, $E_S$ Encoder 602 in FIG. 6 stands for an encoder in the source domain. $E_T$ Encoder 612 stands for an encoder in the target domain. $D_S$ Decoder 605 stands for a decoder in the source domain and $D_T$ decoder stands for a decoder in the target domain. the image-style transfer network (e.g. 308) is further accompanied with a discriminator to validate the perceived quality of the generated image during model training.

The encoders 602 612 receive the input image $I_d$ wherein d represents the domain index including source domain S and target domain T, and the input image $I_d$ could be represented as both content features $c_d$ and style features $z_d$ after through layer encoding:

$$(c_d, z_d) = E_d(I_d) \quad (1)$$

The encoder $E_d$ is constructed with parallel network branches: a content encoder and a style encoder from the d domain. The content encoder is responsible to extract content features $c_d$; while the style encoder is responsible to extract style features $z_d$. Each network branch provides a sequential process to extract corresponding features, which may utilize a plurality of convolution layers, a plurality of pooling layers, and a fully connected layer.

Figure 7:
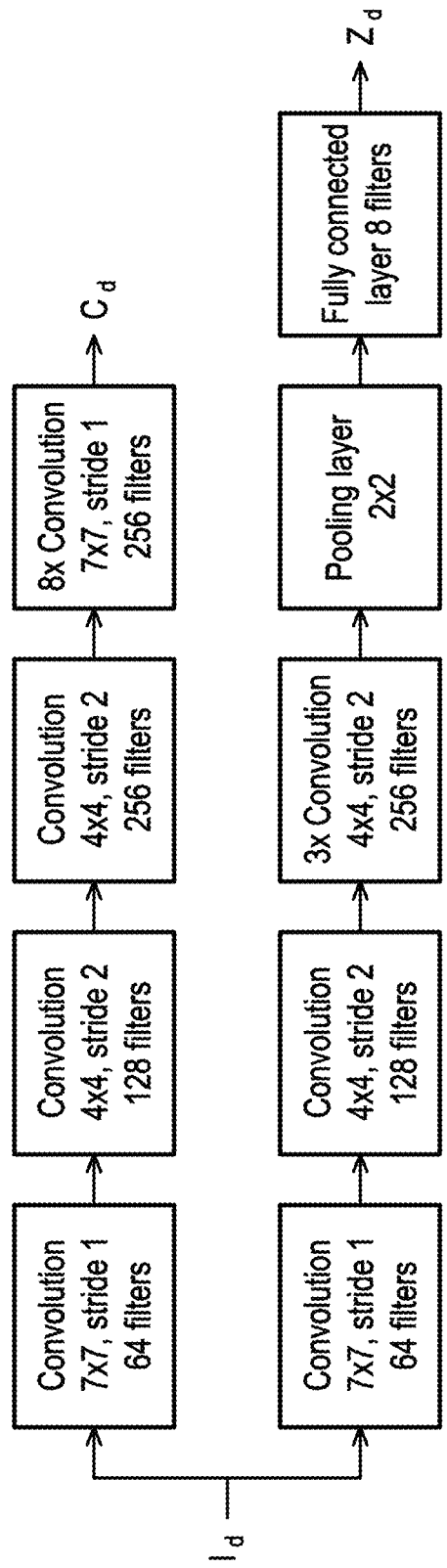
FIG. 7 illustrates a flow chart that describes an architecture of an encoder used in the image-style transfer of FIG. 6 according to an exemplary embodiment of the disclosure.

To be more specific, images from the source domain without annotations. $I_S$ Input 601, and images from the target domain without annotations. $I_T$ Input 611, are received and to be processed on a pair by pair basis. It should be noted that while the images could be received with annotations, annotations would not be needed for unsupervised trainings. $I_S$ Input 601 and $I_T$ Input 611 are respectively received by $E_S$ encoder 602 and $E_T$ encoder 612. The $E_S$ encoder 602 would extract $I_S$ Input 601 as $Z_S$ Map 603 and $C_S$ Map 604, and the $E_T$ encoder 612 would extract $I_T$ Input 611 as $Z_T$ Map 613 and $C_T$ Map 614. $Z_S$ Map 603 is the style feature in the source domain while $C_S$ Map 604 is the content feature for the source domain. Similarly. $Z_T$ Map 613 is the style feature in the target domain while $C_T$ Map 614 is the content feature for the target domain. The branch network architecture of the encoder 602 612 as shown in FIG. 6 would include a plurality of DNN layers, and the details of which is shown in FIG. 7. FIG. 7 shows multiple DNN layers which receive an input image $I_d$ from a particular domain and extract input image $I_d$ as the content features and $c_d$ and style features $z_d$ for the particular domain.

Figure 8:
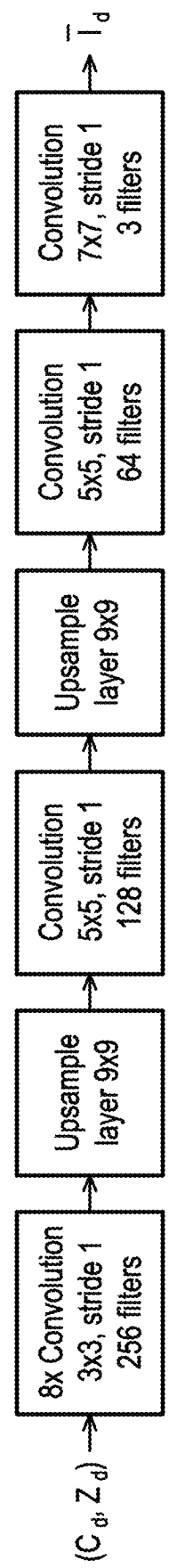
FIG. 8 illustrates a flow chart that describes an architecture of an decoder used in the image-style transfer of FIG. 6 according to an exemplary embodiment of the disclosure.

The decoder $D_d$ provides a sequential process to process and extrapolate features by utilizing a plurality of convolution layers and a plurality of up-sample layers to the d domain where d is either T (target) or S (source). The decoder is responsible for reproducing/generating output images as a result of the image-style transfer from the source domain to the target domain. As an example, an architecture of the decoder is illustrated in FIG. 8 which shows that the content features and $c_d$ and style features $z_d$ for the particular domain undergoes through the DNN layers in order to generate an output image $I_D$, for the particular domain. In this way, the source domain decoder $D_S$ decoder 605, receives $Z_S$ Map 603. $C_S$ Map 604, and $Z_T$ map 613 to generate a target-styled output image ($\tilde{I}_{S \to T}$) and a source-styled output image ($\tilde{I}_{S \to S}$). Similarly, the target domain decoder $D_T$, receives $C_S$ Map 604. $Z_T$ map 613. $C_T$ Map 614 to generate the target-styled output image ($\tilde{I}_{T \to T}$) and a source-styled output image ($\tilde{I}_{T \to S}$). As the product of the decoding process, the four possible image-style transfers are further described as follows:

(1) Source-to-Source Transfer
This transfer takes features from the source domain ($c_S$, $z_S$) of input $I_S$ to generate a source-styled output image ($\tilde{I}_{S \to S}$), which can be expressed as:

$$\tilde{I}_{S \to S} = D_S(c_S, z_S) \quad (2)$$

This image-style transfer is considered a pseudo transfer, which could help the model training to tune both encoder and decoder for achieving an appropriate set of model weights to either extract or process features correctly from source domain images.

(2) Target-to-Target Transfer
This transfer takes features from the target domain ($c_T$, $z_T$) of input $I_T$ to generate a target-styled output image ($\tilde{I}_{T \to T}$), which can be expressed as:

$$\tilde{I}_{T \to T} = D_T(c_T, z_T) \quad (3)$$

This image-style transfer is considered a pseudo transfer, which could help the model training to tune both encoder and decoder for achieving an appropriate set of model weights to either extract or process features correctly from target domain images.

(3) Source-to-Target Transfer
This transfer takes content features from the source domain and a normalized distribution of style features from the target domain ($c_S$, $z_T$) of input $I_S$ to generate a target-styled output image ($\tilde{I}_{S \to T}$), which can be expressed as:

$$\tilde{I}_{S \to T} = D_S(c_S, z_T) \quad (4)$$

For this embodiment, subsequent steps are processed based on the target-styled output images.

(4) Target-to-Source Transfer
This transfer takes content features from the target domain and a normalized distribution of style features from the source domain ($c_T$, $Z_S$) of input $I_S$ to generate a target-styled output image ($\tilde{I}_{T \to S}$), which can be expressed as:

$$\tilde{I}_{T \to S} = D_T(c_T, Z_S) \quad (5)$$

Figure 9:
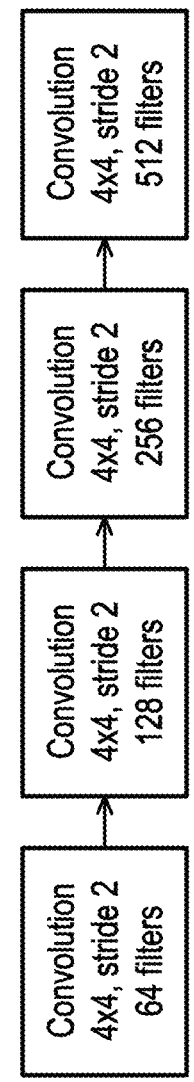
FIG. 9 illustrates a flow chart that describes an architecture of a discriminator used in the image-style transfer of FIG. 6 according to an exemplary embodiment of the disclosure.

In order to train the image-style transfer network 408, pairs of unlabeled images from both source domain and target domain could be collected to construct both training and validation datasets. Such training may employ a weighted sum of loss values, of which each loss value is calculated based on the corresponding loss function. There could be two loss functions in this embodiment including a general and loss function and a specific loss function. The general loss function would quantify the perceived similarity between an input image and output image according to a discriminator network $X_d$, which is illustrated in FIG. 9 which shows an architecture of a discriminator used in the image-style transfer of FIG. 6 according to an exemplary embodiment of the disclosure.

Similar to both encoder Ed and decoder Dd, the discriminator network provides a probabilistic index of image style for each domain. The general loss function for the source domain is expressed as follows:

$$L_{I_S}^X = \log(1 - X_S(\tilde{I}_{T \to S})) + \log X_S(I_S) \quad (6)$$

and the general loss function for the target domain is expressed as follows:

$$L_{I_T}^X = \log(1 - X_T(\tilde{I}_{S \to T})) + \log X_T(I_T) \quad (7)$$

The specific loss function compares specific parts of the image-style transfer network between the source domain and the target domain. The following are the specific loss function for content features from the source domain and the target domain inputs, respectively:

$$L_{C_S} = \|c_T(E_T(\tilde{I}_{S \to T})) - c_S\|_1 \quad (8)$$

and $$L_{C_T} = \|c_S(E_S(\tilde{I}_{S \to T})) - c_T\|_1 \quad (9)$$

The following are the specific loss function for style features from the source domain and the target domain inputs, respectively:

$$L_{z_S} = \|z_S(E_S(\bar{I}_{T \to S})) - z_S\|_1 \qquad (10)$$

and $$L_{z_T} = \|z_T(E_T(\bar{I}_{S \to T})) - z_T\|_1 \qquad (11)$$

The following are the specific loss function for style features from the source domain and the target domain inputs, respectively:

$$L_{I_S} = \|\bar{I}_{S \to S} - I_S\|_1 \qquad (12)$$

and $$L_{I_T} = \|\bar{I}_{T \to T} - I_T\|_1 \qquad (13)$$

These specific loss functions provide quantitative benchmarks for each specific part of the image-style transfer network in order to iteratively adjust the network weights.

As seen in FIG. 4, there are several types of image data used for the two-stage detector including a set of (manually) annotated images from the source domain $R_S$ (e.g. 403 406), a minority set of (manually) annotated images from the target domain dataset $R_T^1$ (e.g. 401 402), and a majority set of unannotated images from target domain (e.g. 407). All of these sets of image data may imply a single range of object classes. The source domain dataset $R_S$ may include P number of $I_S$ images and corresponding $A_S$ annotations or labels (annotations for these labels could be manually generated) while the minority set of (manually) annotated images from the target domain dataset $R_T^1$ may include $Q^1$ number of $I_T^1$ images and corresponding $A_T^1$ labels (annotations could be manually generated). The majority set of unannotated images from target domain $R_T^2$ may include $Q^2$ number of $I_T^2$ images that were initially unannotated. Between $R_T^1$ and $R_T^2$, the relationships of the data amount is $Q^1 \ll Q^2$.

The main purpose of the two-stage detector is to perform domain transfer from a source domain to the target domain with a requirement of the minimum amount of manually labeled target dataset for the supervised detector scheme. As shown in FIG. 4 the two-stage detector includes the Target OD-Full Pseudo-Label Model 404 and Target OD-Lite Detector Model 411. Between pseudo-labeler 404 and the main detector 411, the functionality and network architecture are similar but different. The functionality of the pseudo-labeler 404 is to generate $A_T^2$ labels for the majority set of unannotated images from target domain $R_T^2$; while the main detector is to be deployed as a perception engine into the target platform(s).

Figure 10:
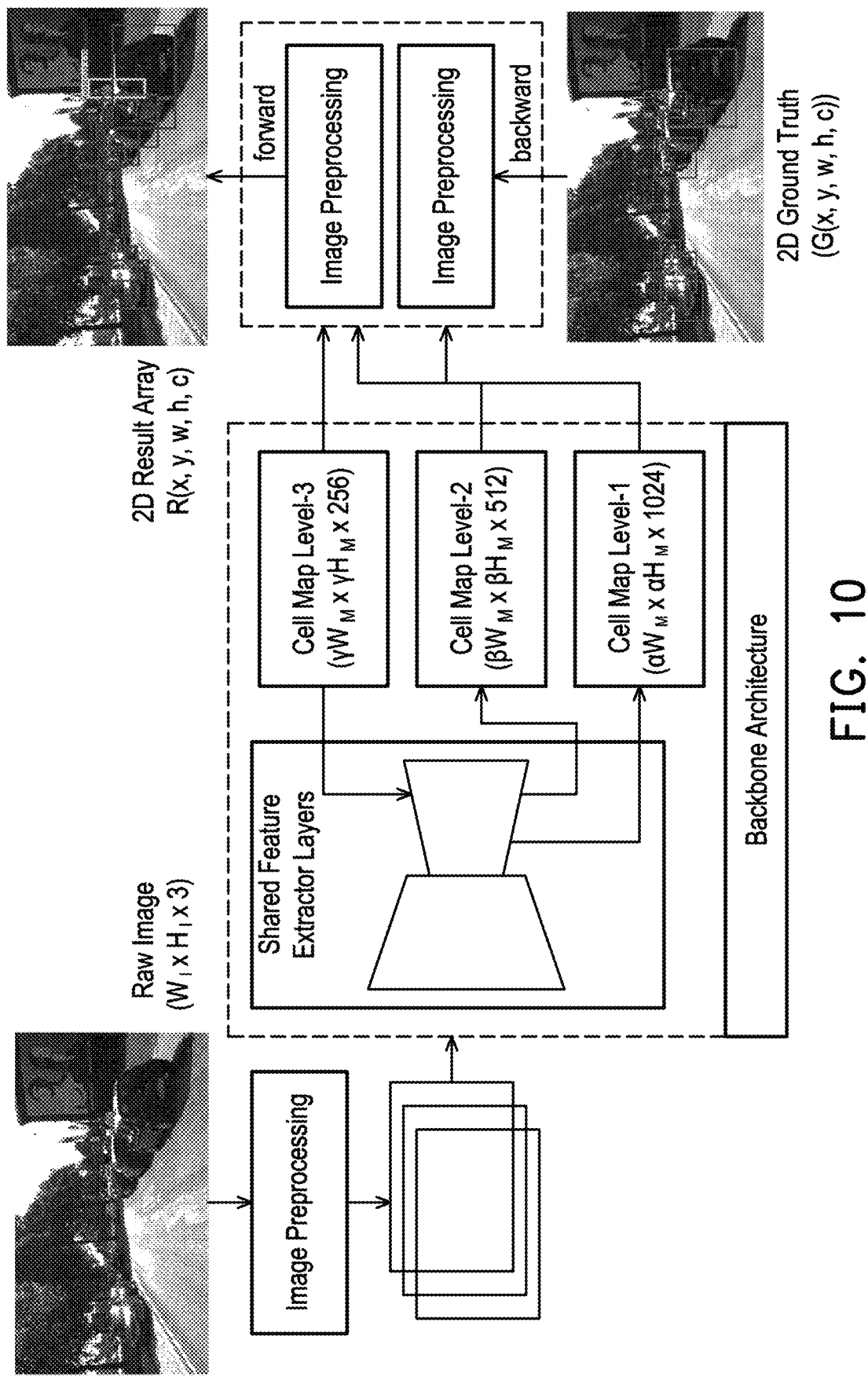
FIG. 10 illustrates an example of a two-stage detector according to an exemplary embodiment of the disclosure.

FIG. 10 illustrates an example of a two-stage detector according to an exemplary embodiment of the disclosure. Referring to FIG. 10, the detector architecture of FIG. 10 includes a backbone and an end-layer branch. The backbone is responsible to extract features at multi-scale resolutions; while end-layer branch concatenates the multi-scale features for prediction regression of bounding boxes. The backbone of the main detector 411 is more concise than the backbone of the pseudo-labeler 404, while the end-layer the main detector 411 of is identical to the end-layer of the pseudo-labeler 404.

Figure 11:
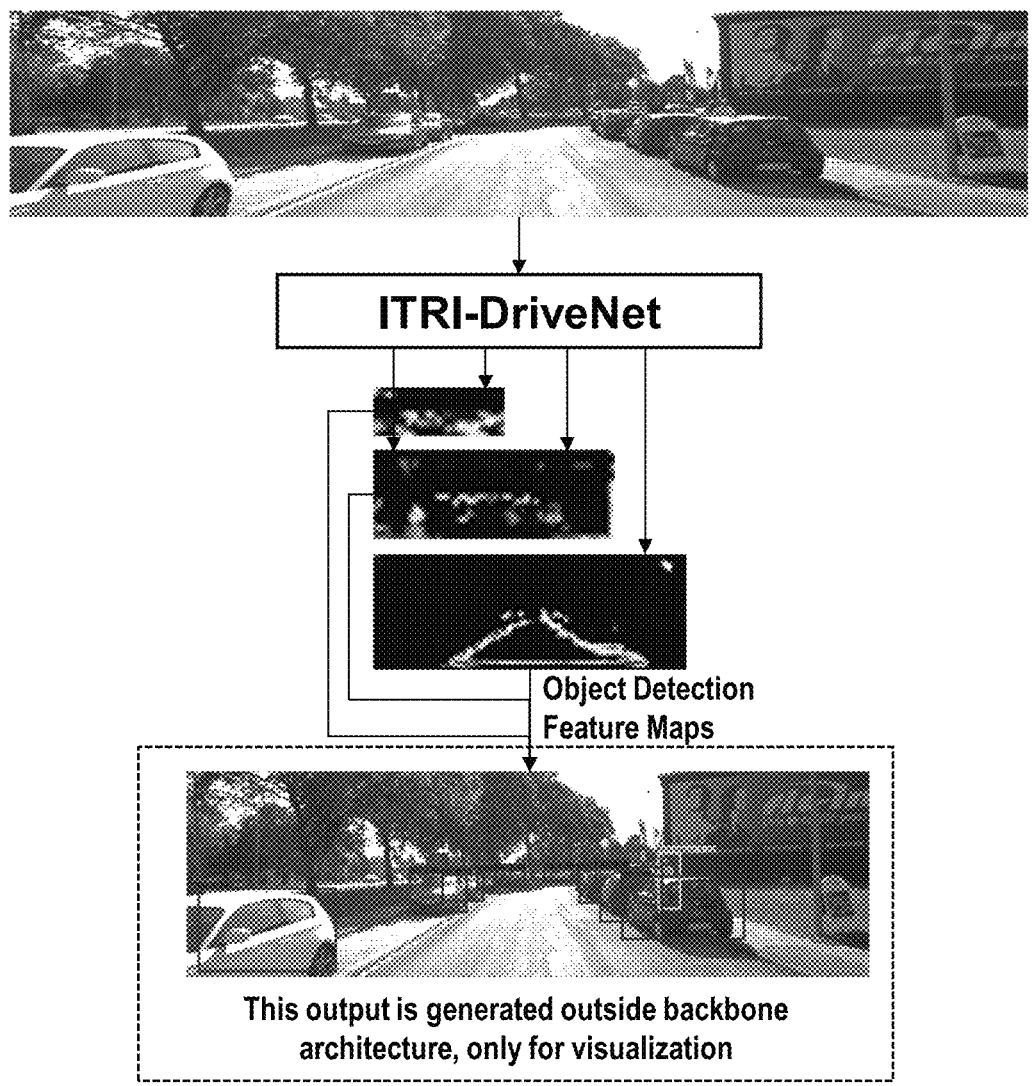
FIG. 11 illustrates using ITRI-DriveNet as a backbone architecture for performing an object detection from a raw image according to an exemplary embodiment of the disclosure.

FIG. 11 illustrates using ITRI-DriveNet as a backbone architecture for performing an object detection from a raw image according to an exemplary embodiment of the disclosure. The function of the backbone architecture of FIG. 11 is to receive an Input image from image preprocessing (I) and to process the input image (I) for any features using a single deep convolution neural network architecture of which features stack includes a pyramid structure that is being shared for all task(s) so as to output Pyramidal feature stack ($F_1$, $F_2$, $F_3$). It should be noted that the exact contents of the pseudo-labeler 404 and the main detector 411 including their backbone architecture and the end layer are currently known and is not the main point of the disclosure.

Figure 12:
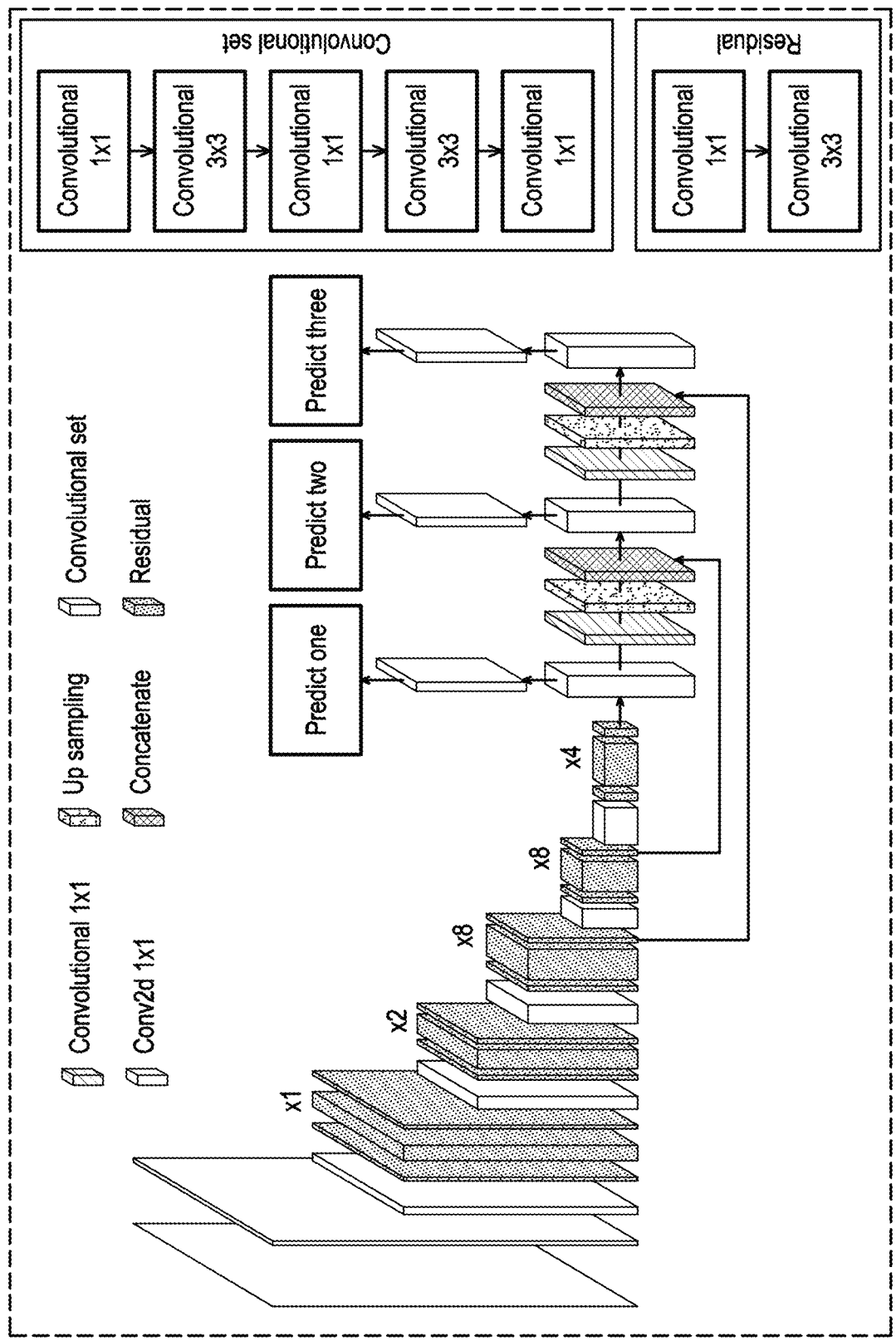
FIG. 12 illustrates the backbone architecture of FIG. 11 in further details according to an exemplary embodiment of the disclosure.

A summary of the content of a backbone architecture is shown in FIG. 12. Besides using ITRI-DriveNet as the backbone architecture, the alternatives may also be suitable as long as it has the properties including a DNN architecture, a pyramid structure of feature convolutions, and scalability to have a full-sized architecture and compact-sized architecture (via pruning).

Figure 13:
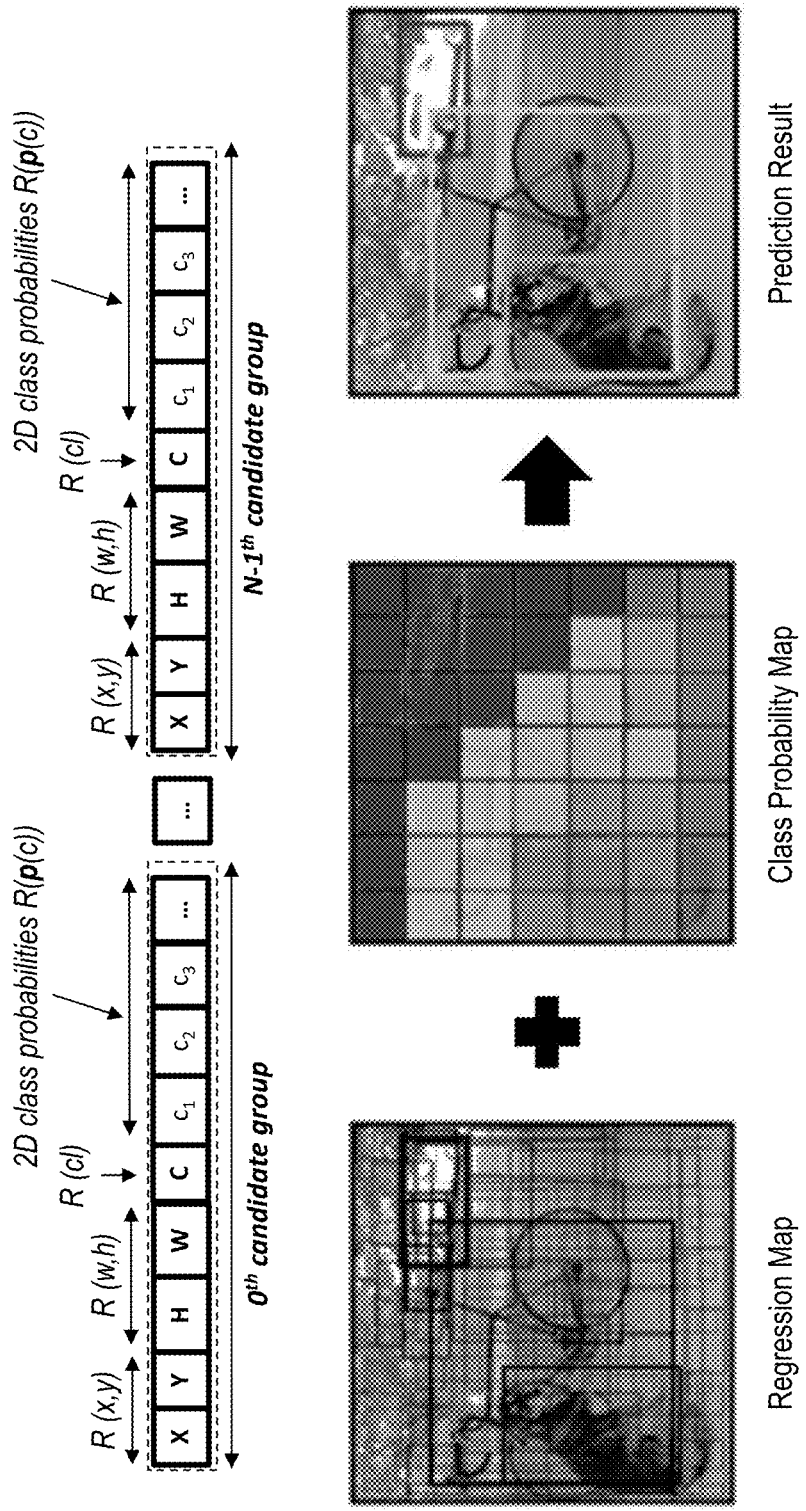
FIG. 13 illustrates an implementation of the end-layer branch according to an exemplary embodiment of the disclosure.

FIG. 13 illustrates an implementation of the end-layer branch according to an exemplary embodiment of the disclosure. As shown in FIG. 13, the end-layer branch would receive Detection Box Candidates (R(x, y, w, h, cl, p)) and output Detection Box Predictions (R(x, y, w, h, c, cl, p)) with its purpose being to receive a regression map in combination with a class probability map to produce a prediction result. In other words, the main function of the end-layer branch is, during forward inference, to merge the functionality of point and 2D object detections, a plurality of anchor boxes from backbone architecture is generated with a particular array assignment for enabling point prediction as well as detection box candidates.

The implementation of the two-stage detector as described in FIG. 10~FIG. 13 is explained in further details as follows. The network structure of both the pseudo-labeler 404 and the main detector 411 could be fundamentally analogous as both including a backbone network and a prediction network as shown in FIG. 10. The architectural distinction of both models relies on the size and depth of the backbone network for either pseudo-labeler 404 or main detector 411. The size and depth could be indicated by the number of floating-point operations per second (assuming that both model resolutions $W_M \times H_M$ are identical).

Between the pseudo-labeler 404 and the main detector 411, the relationship between the size and depth of either model is pseudo-labeler 404>>the main detector 411. For this embodiment, the size and depth of the pseudo-labeler 404 are quantified as 40 GFLOPS and the main detector 411 are quantified as 20 GFLOPS. This configuration is by design to emphasize steep detection accuracy for the pseudo-labeler 404—enabling accurate labels for $A_T^2$; to emphasize low complexity for the main detector 411—enabling a lightweight model for deployment into a low-cost platform(s).

Suppose an annotated image with dimensions of $W_I \times H_I \times 3$, where $W_I$ and $H_I$ are pixel width and pixel height of raw image $I_I$, respectively. The $I_I$ images are firstly resized using an image preprocessing module that forces the dimension of $I_I$ to follow model resolution denoted as $W_M \times H_M$. Inside the image preprocessing module, a function to normalize the spatial dimensions of $I_I$ images to conform with the corresponding model resolution comprises image padding and image resize. The image padding performs as preliminary action to normalize the aspect ratio of $I_I$ images for conforming with the aspect ratio of model resolution. Later, the padded image is then resized to finally conform with the model resolution using a certain technique of image resize. (e.g. bicubic interpolation, shown in FIG. 14.) The output from the image preprocessing module is the input image (I).

The I images are then processed inside the backbone architecture for any features using a single deep convolution neural network architecture; of which the feature stack comprises a pyramid structure that is being shared for the object detection task. This architectural structure of the backbone architecture resembles the encoder-decoder architecture. As stated previously, the backbone architecture of both the pseudo-labeler 404 and the main detector 411 are fundamentally analogous with distinctive size and depth for the corresponding emphasis on either model accuracy for the pseudo-labeler 404 or model complexity for the main detector 411. The encoder of either model generates stacks of feature maps in an inverse pyramidal structure.

The first stack level of feature maps ($F_1$) includes a stack of features with dimensions of $\alpha W_M \times \alpha H_M \times 1024$, where a stands for the scaling factor to indicate relevance with the model resolution. This $F_1$ map includes a high volume of features that enables larger contextual predictions for both tasks. The second ($F_2$) and third ($F_3$) stack levels of feature maps are obtained from the earlier feature map stack with dimensions of $\beta W_M \times \beta H_M \times 512$ and $\gamma W_M \times \gamma H_M \times 256$, where $\beta$ and $\gamma$ are the scaling factors to also indicate relevance with the model resolution. These larger feature map stacks ($F_2$ and $F_3$) allow finer contextual predictions for both tasks. All $F_1$-$F_3$ stacks are then concatenated using a certain technique such as FPN (feature pyramid network).

Figure 14:
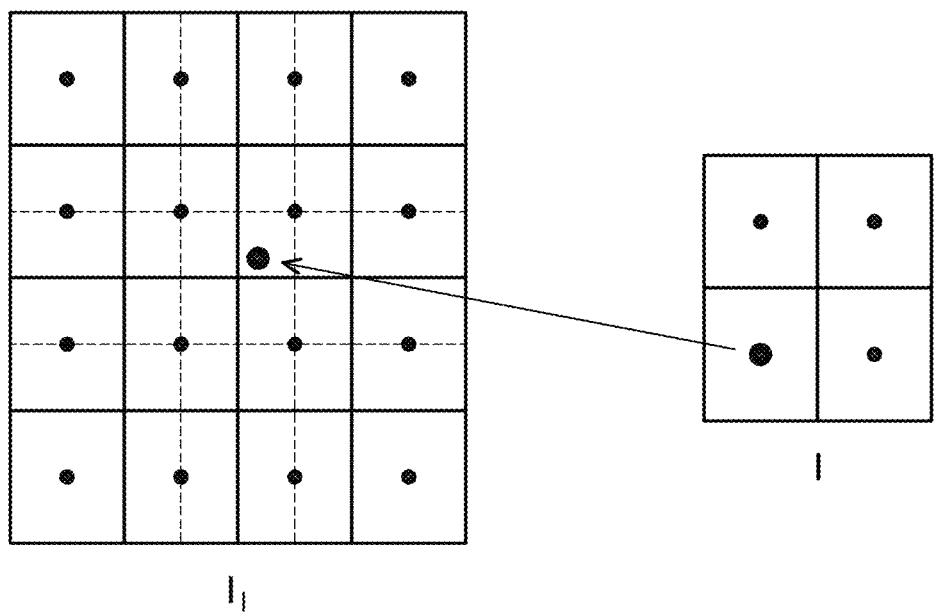
FIG. 14 illustrates an embodiment of image re-sizes using bicubic interpolation according to an exemplary embodiment of the disclosure.

FIG. 14 illustrates an embodiment of image re-sizes using bicubic interpolation according to an exemplary embodiment of the disclosure. The native application of the backbone architecture used in this exemplary embodiment is for 2D object detection, which uses a set of anchor boxes to provide prediction estimation on the prediction layer or concatenation layer. These anchor boxes originated from a set of bounding boxes with dimensions/aspect ratios that are estimated using a certain clustering algorithm (e.g. K-means clustering) to find the most representative bounding boxes from labeled data in the network training dataset. Only anchor boxes with the highest prediction score will be preserved against competing anchor boxes of the prediction set R(x, y, w, h, c, cl, p) with the total number of bounding boxes denoted as N. The x, y denote the center coordinate of the bounding box and w, h represent the width and height of the bounding box. The cl stores the classification score or detection confidence; while p is an array of class probabilities in the object detection class list.

During backward training or forward inference of object detection task, the R(x, y, w, h, c, cl, p) are compared against G(x, y, w, h, c) based on location coordinate ($L_{xy}$), box dimension ($L_{wh}$), class probability ($L_c$) and confidence ($L_{cl}$) formulated as:

$$L_R = \frac{\sum_f L_{xy}(f) + L_{wh}(f) + L_c(f) + L_{cl}(f)}{mf} \quad (13)$$

where mf=batch number and f=frame index. Each loss value in (13) is described in the following mathematical expressions: (a) the location coordinate loss is mathematically expressed as:

$$L_{xy} = \lambda_{xy} \sum_{i=0}^{\gamma W_M \times \gamma H_M} \sum_{j=0}^{A} \mathbb{1}_{ij}^{bb}\left((R_i(x) - G_i(x))^2 + (R_i(y) - G_i(y))^2\right) \quad (14)$$

where $\lambda_{xy}$ denotes the normalization weight for the positive xy-prediction and $\mathbb{1}_{ij}^{bb}$ is the presence indication of any R inside $i^{th}$ cell at $j^{th}$ anchor box. A denotes the total number of anchor boxes; (b) the box dimension loss is computed as:

$$L_{wh} = \lambda_{xy} \sum_{i=0}^{\gamma W_M \times \gamma H_M} \sum_{j=0}^{A} \mathbb{1}_{ij}^{bb}\left((\sqrt{R_i(w)} - \sqrt{G_i(w)})^2 + (\sqrt{R_i(h)} - \sqrt{G_i(h)})^2\right) \quad (15)$$

(c) the class probability loss is computed as follows:

$$L_c = \sum_{i=0}^{\gamma W_M \times \gamma H_M} \mathbb{1}_i^{bb}\left(\sum_{c \in classes} (R_i(p(c)) - G_i(p(c)))^2\right) \quad (16)$$

and (d) the confidence loss is formulated as:

$$L_{cl} = \sum_{i=0}^{\gamma W_M \times \gamma H_M} \sum_{i=0}^{A} \mathbb{1}_{ij}^{bb}\left((R_i(cl) - G_i(cl))^2\right) + \\ \lambda_{nobb} \sum_{i=0}^{\gamma W_M \times \gamma H_M} \sum_{i=0}^{A} \mathbb{1}_{ij}^{nobb}\left((R_i(cl) - G_i(cl))^2\right) \quad (17)$$

where $\lambda_{nobb}$ denotes the normalization weight for any negative xy-prediction and $\mathbb{1}_{ij}^{nobb}$ is the absence indication of any R inside $i^{th}$ cell at $j^{th}$ anchor box. The values for $G_i(cl)$ and $G_i(p(c))$ are set as 1.

Figure 15:
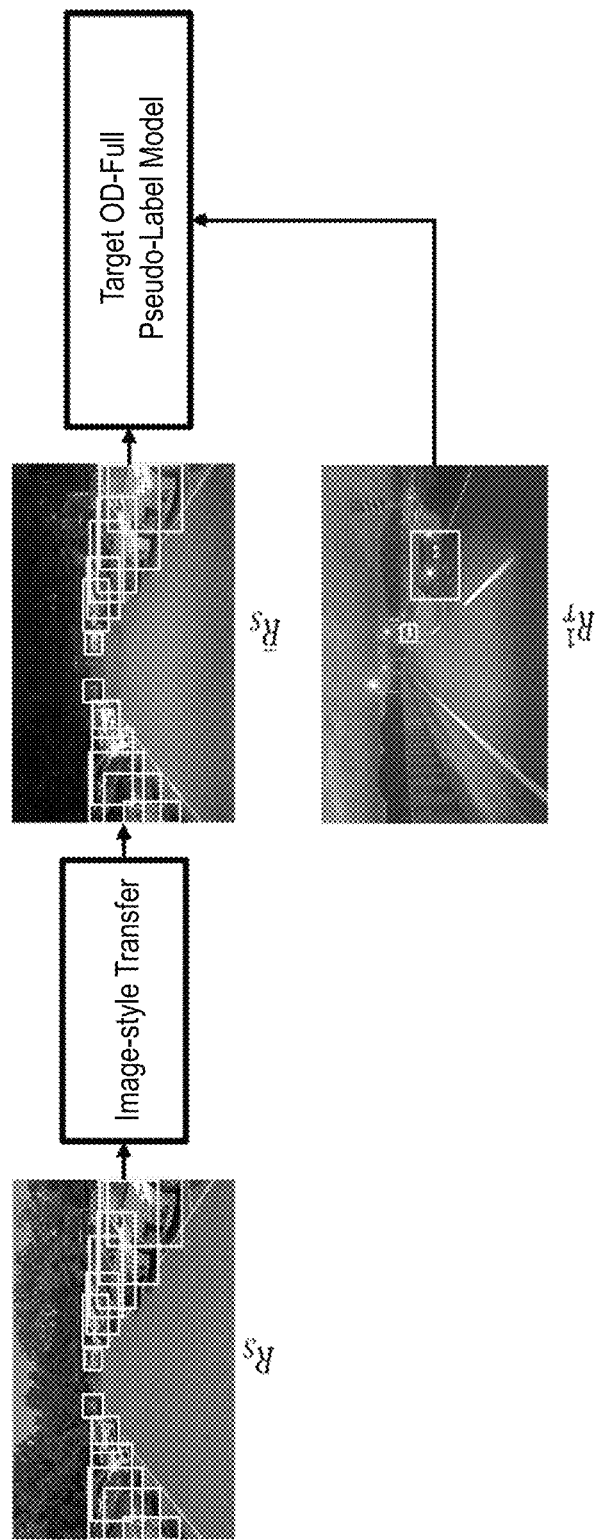
FIG. 15 illustrates model training for a pseudo-labeler according to an exemplary embodiment of the disclosure.

FIG. 15 illustrates model training for a pseudo-labeler 404 according to an exemplary embodiment of the disclosure. The main function of the pseudo-labeler 404 is to annotate the majority set of unannotated images from target domain in $R_T^2$. To serve this purpose, the pseudo-labeler 404 could conservatively trained with supervised learning based on two datasets: the set of annotated images from the source domain $R_S$ and the minority set of annotated images from the target domain $R_T^1$. To be more specific, referring to FIG. 4 pseudo-labeler 404 would receive the annotation (e.g. 2D label) of images from the source domain 403 and the converted images from the source domain having the style of the target domain 409 as well as the annotation (e.g. 2D label) 401 of a minority set of images from the target domain and the corresponding image data (e.g. RBG data) 402 from the target domain to generate the annotations for the majority set of unannotated images from target domain in $R_T^2$. Because the pseudo-labeler is responsible to annotate objects of interest within unannotated target domain images, therefore, model knowledge should perform well in the target domain. Consequently, the labeled source domain dataset $R_S$ would need to be processed through the image-style transfer module 308 to transfer its domain from the source domain into the target domain for each $I_S$ (annotations in $A_S$ would remain unchanged). This process creates the annotated target-styled source domain dataset, namely as $\overline{R}_S$ with $\overline{I}_S$ as the target-styled source domain image and $A_S$ as its corresponding annotation.

Prior to model training, data augmentations could be performed based on both $\overline{R}_S$ and $R_T^1$ as an additional measure to increase data variations with the goal to introduce generalization to the pseudo-labeler 404 during the training phase. In this embodiment, data augmentations may include but are not limited to image cropping, image flipping, image scaling, image rotation, image translation, noise addition, brightness adjustment, contrast adjustment, and hue adjustment.

As for the main detector 411, it includes a backbone architecture and an end-layer branch (or prediction layer) as previously described. Although the backward propagation for the training of the main detector 411 is at best described to be analogous to conservative model training for object detection, the forward propagation for the training of the main detector 411 includes elements that are expected to help the main detector 411 to minimize the impact of the trade-off between accuracy and complexity while utilizing the minimum amount of manually labeled dataset.

Figure 16:
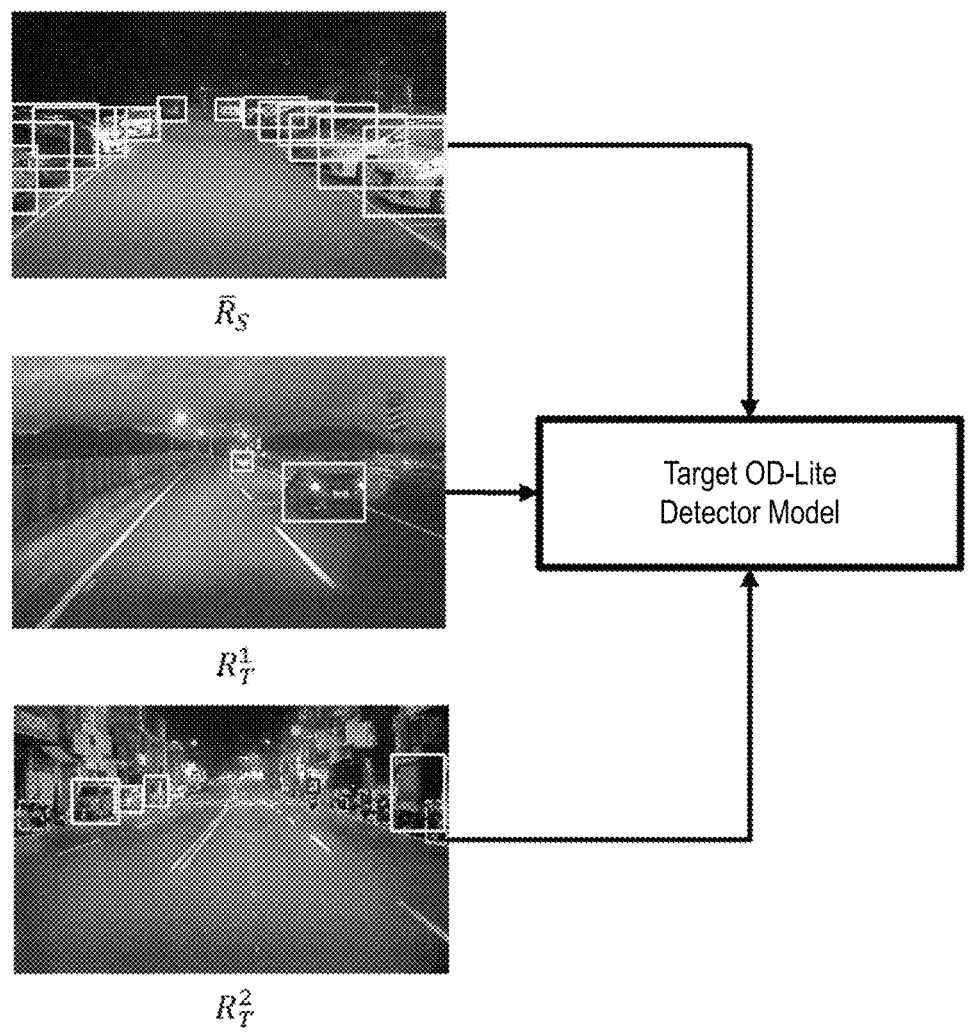
FIG. 16 illustrates model training for a main detector according to an exemplary embodiment of the disclosure.

FIG. 16 illustrates model training for a main detector 411 according to an exemplary embodiment of the disclosure. The main purpose of the main detector 411 relies on its purpose to provide a robust yet lightweight model for deployment on a power-constrained hardware platform in the target domain. To serve this purpose, the main detector 411 would perform an adaptive domain adaptation and subsequently is trained with supervised learning based on three datasets (within the target domain): the converted source domain images having image styles of the target domain $\overline{R}_S$, the minority set of annotated images from the target domain $R_1^T$, and the majority set of annotated images from target domain dataset $R_2^T$ as shown in FIG. 16. Prior to model training, data augmentations could be performed based on said datasets $\overline{R}_S$, $R_1^T$ and $R_2^T$ as an additional measure to increase data variations with the goal to introduce a degree of generalization to the main detector 411 during the training phase. In this embodiment, data augmentations may include but are not limited to image cropping, image flipping, image scaling, image rotation, image translation, noise addition, brightness adjustment, contrast adjustment, and hue adjustment.

Unlike model training for the pseudo-labeler 404, the model training for the main detector involves 411 functions to be implemented by an active domain adaptation module 410 that fundamentally introduces a dynamic scheduling policy to moderate density-driven gradients against model uncertainty and class imbalance; thus increasing the efficiency of model training based on said datasets. Within the active domain adaptation module 410, the concept of class density is introduced as a means to calculate the prevalence of a class in the target domain and estimate the categorical gaps between other classes. By selecting examples of a class with the largest categorical gaps and least amount of queried annotations, the model could emphasize model training within the corresponding class.

Class density is defined as a measurement of how common an object annotation such as a bounding box prediction R is predicted as a certain class in the target domain. To quantify the class density, the feature z of a bounding box prediction R is measured by the average feature of all pixels within the bounding box prediction R. Given a class c, a feature vector z, the c-th class density is expressed as follows:

$$\delta_c = \rho(z) \tag{18}$$

As the probability that z is classified as c in the target domain. The estimation of $\rho(z)$ is characterized by density estimators, which are constructed based on the set of Gaussian Mixture Models (GMMs) that observes z values of c-th class in all datasets used to train the main detector 411. The construction of these density estimators is an offline execution.

From the class density metric, the active domain adaptation module 410 may select examples that contribute most to the performance gap so that the main detector 411 model could be adapted from all target domain datasets including $\overline{R}_S$, $R_T^1$, and $R_T^2$ via density difference metric. Suppose K is the total number of classes in all target domain datasets, and the density difference metric of c is characterized as the log-likelihood ratio between c-th class density against the average of all class densities for each training step t as:

$$\Delta\delta_c(t) = \log\frac{\delta_c(t) \times nc}{\sum_{k}^{K}\delta_k(t)} \tag{19}$$

Based on Equation (19), classes with smaller $\Delta\delta_c$ are more prevalent in target domain datasets and less observable against other competing classes. Therefore, examples with small $\Delta\delta_c$ will be prioritized to replenish the insufficient knowledge of $M^2$ from the class imbalance.

Once the prioritized class is identified for the t-th training step, the subsequent step would be to control for eligible examples to be released for gradient descent through calculations of loss functions as previously described. To achieve this data training regulation, a scheduling policy is designed to compare each bounding box prediction's confidence p against a threshold $\tau(t)$. Any bounding box with confidence p larger than the corresponding threshold $\tau(t)$ would be removed from calculations of loss functions. Should a bounding box prediction's class c be a prioritized class, the following scheduling policy applies as follows:

$$\tau(t) = \left(e^{\left(\left(\frac{t}{T}-1\right)\times K\right)}\right) \times \left(1 - \frac{1}{K}\right) + \frac{1}{K} \tag{20}$$

On the other hand, should a bounding box prediction's class c be not a prioritized class, the following scheduling policy applies as follows:

$$\tau(t) = \left(1 - e^{\left(-\frac{t}{T}\times K\right)}\right) \times \left(1 - \frac{1}{K}\right) + \frac{1}{K} \tag{21}$$

FIG. 17 illustrates a comparison of Environment Specifications between this present disclosure and a baseline. Herein, the disclosure is benchmarked against the baseline framework in FIG. 17 to acknowledge the efficacy of implemented contributions including image-style transfer and active domain adaptation over the conservative supervised learning. Both the disclosure and baseline framework are represented with an identical network architecture from the main detector to perform object detection tasks as both have trained the main detector with identical conditions (e.g. model resolution, elapsed training time, hardware and software specifications) except for the corresponding training scheme and the datasets. The baseline framework was trained with the conservative supervised learning based on 24,768 frames of the manually annotated dataset. On the other hand, the disclosure was trained according to the two-stage detector that includes image-style transfer and active domain adaptation based on 12,384 frames of a manually annotated dataset. Both the disclosure and the baseline frameworks were benchmarked with an identical validation dataset.

The assessment metric used to quantify the object detection evaluation is based on a statistical measure of how well objects are detected and classified according to a degree of overlap between prediction and ground truth (i.e. intersection over union or IoU). Said metric, namely accuracy, could measure the proportion of correct predictions (true positives) among the total number of detections of an object class, which is calculated as:

$$\text{Accuracy}(c) = \frac{TP(c)}{TP(c) + FP(c) + FN(c)} \quad (22)$$

For this experiment, the accuracy averages the accuracies for each class in the network architecture (both proposed and baseline frameworks) that can be mathematically expressed as follows:

$$\text{Accuracy} = \frac{1}{nc} \times \sum_{c}^{nc} \text{Accuracy}(c) \quad (23)$$

TP, FP, and FN in (22) are true-positive, false-positive, and false-negative predictions. The determination of true and false predictions is based on the IoU metric that measures the overlapping ratio of bounding boxes between the prediction set and corresponding ground truth.

Figure 18:
FIG. 18 illustrates a performance comparison between this present disclosure and the baseline.

FIG. 18 illustrates a performance comparison between this present disclosure and the baseline. According to FIG. 18, the disclosure achieved an average accuracy of 87.8%; while the baseline framework achieved an average accuracy of 87.2%. This condition describes an average detection enhancement of 0.6%, which is implying that the disclosure was able to maintain the detection performance from the baseline architecture with 50% fewer amount of manually labeled datasets. From a class-wise perspective, the baseline framework suffered from a class imbalance between pedestrian and four-wheels classes as noted with a performance gap of 15.7%. On the other hand, the disclosure was able to manage and reduce the effect of a class imbalance between pedestrian and four-wheels classes with a reduction in the performance gap of 4.2%.

In view of the aforementioned-descriptions, the present disclosure is suitable for being used by any computer system or used by a motor vehicle or a robotic system and is able to accurately and efficiently detect objects from images captured by an image sensor or a camera.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An object detection method for detecting one or more objects using a plurality of deep convolution neural layers, the method comprising:
   obtaining a set of a plurality of object annotated images which are in a source domain and have a first image style;
   obtaining a minority set of a plurality of object annotated images which are in a target domain and having a second image style;
   obtaining a majority set of a plurality of unannotated images which are in the target domain and having the second image style;
   performing an image style transfer from the source domain to the target domain by converting the plurality of object annotated images in the source domain from having the first image style into having the second image style to generate a converted set of object annotated images having the second image style;
   training a pseudo-labeler with supervised training based on the converted set of object annotated images having the second image style and the minority set of the object annotated images in the second image style;
   generating, by the pseudo-labeler, object annotations for the majority set of the plurality of unannotated images in the second image style to change from the majority set of a plurality of unannotated images into a majority set of a plurality of annotated images; and
   performing an active domain adaptation by adapting the minority set of a plurality of object annotated images, the converted set of object annotated images, and the majority set of the plurality of annotated images so as to generate an object detection model.

2. The object detection method of claim 1 further comprising:
   recognizing a classification of a detected object of a captured image by using the object detection model to indicate the detected object with an object annotation which indicates that the detected object has been classified.

3. The object detection method of claim 2, wherein the object annotation is a two-dimensional (2D) label which is a 2D bounding box or a perspective-induced 2D bounding box or a 2D point to indicate that the object of the target image has been classified.

4. The object detection method of claim 2, wherein performing the classification of the detected object of the captured image based on the object detection model comprising:
   performing the classification of the detected object of the captured image with the least annotation density based on density estimators which are prioritized for gradient descent according to a scheduling policy.

5. The object detection method of claim 2 further comprising:
   generating a model for a main detector which comprises a backbone architecture and an end layer and is generated in response to performing supervised training based on the active domain adaptation.

6. The object detection method of claim 5, further comprising:
   performing a data augmentation on the minority set of the plurality of object annotated images, the converted set of object annotated images, and the majority set of the plurality of annotated images to increase data variations so as to introduce a degree of generalization to the main detector during the supervised training.

7. The object detection method of claim 5, wherein the backbone architecture is configured to extract features at multi-scale resolutions, and end layer branch is configured to concatenate the multi-scale features to generate prediction regression for the object annotation.

8. The object detection method of claim 1, wherein performing the image style transfer comprising:
constructing a plurality of deep convolution neural layers which converting from the first image style of a 2D data array of the source domain into the second image style of another 2D data array of the target domain to generate the converted set of object annotated images having the second image style.

9. The object detection method of claim 8, wherein constructing the plurality of deep convolution neural layers further comprising:
encoding a 2D data array of a raw input space into a plurality of data arrays of a feature space and a first plurality of data arrays of a style space.

10. The object detection method of claim 9, wherein constructing the plurality of deep convolution neural layers further comprising:
replacing the first plurality of data array of the style space with a second plurality of data arrays of the style space from the target domain and combining the second plurality of data arrays of the style space with the plurality of data arrays of the feature space.

11. The object detection method of claim 9, wherein the set of the plurality of object annotated images which are in the source domain has a different quantity from the minority set of the plurality of object annotated images which are in the target domain plus the majority set of the plurality of unannotated images which are in the target domain.

12. The object detection method of claim 9, wherein in response to the set of the plurality of object annotated images which are in the source domain has a different quantity from the minority set of the plurality of object annotated images which are in the target domain plus the majority set of the plurality of unannotated images which are in the target domain, the processor is further configured to duplicate either an image in the source domain or an image in the target domain so that the quality is no longer different.

13. The object detection method of claim 8, wherein the performing the image style transfer from the source domain to the target domain comprising:
performing unsupervised learning by pairing a first image from the source domain without any annotation with a second image from the target domain without any annotation.

14. The object detection method of claim 13 further comprising:
performing a source domain encoding the first image by extracting a first style feature and a first content feature from the first image; and
performing a target domain encoding the second image by extracting a second style feature and a second content feature from the second image.

15. The object detection method of claim 14 further comprising:
performing a source domain decoding by receiving the first style feature, the first content feature, and the second style feature to generate a source target output image and a source to source output image; and
performing a target domain decoding by receiving the first content feature, the second content feature, and the second style feature to generate a target to target output image and a source to target output image.

16. The object detection method of claim 14 further comprising:
calculating loss functions for the first style feature and the second style feature; and
performing a benchmark based on the calculated loss functions by iteratively adjusting weights of the plurality of deep convolution neural layers.

17. The object detection method of claim 1, performing a data augmentation on the minority set of the plurality of object annotated images and the converted set of object annotated images so as to introduce a degree of generalization to the pseudo-labeler during the supervised training.

18. An object detection apparatus comprising:
a storage device; and
a processor coupled to the storage device and configured to:
obtain a set of a plurality of object annotated images which are in a source domain and have a first image style;
obtain a minority set of a plurality of object annotated images which are in a target domain and having a second image style;
obtain a majority set of a plurality of unannotated images which are in the target domain and having the second image style;
perform an image style transfer from the source domain to the target domain by converting the plurality of object annotated images in the source domain from having the first image style into having the second image style to generate a converted set of object annotated images having the second image style;
train a pseudo-labeler with supervised training based on the converted set of object annotated images having the second image style and the minority set of the object annotated images in the second image style;
generate, by the pseudo-labeler, object annotation for the majority set of the plurality of unannotated images in the second image style to change from the majority set of a plurality of unannotated images into a majority set of a plurality of annotated images; and
perform an active domain adaptation by adapting the minority set of a plurality of object annotated images, the converted set of object annotated images, and the majority set of the plurality of annotated images so as to generate an object detection model.

19. A non-transitory storage medium which stores computer readable program loaded into a processor of a computer to control the computer to perform functions comprising:
obtaining a set of a plurality of object annotated images which are in a source domain and have a first image style;
obtaining a minority set of a plurality of object annotated images which are in a target domain and having a second image style;
obtaining a majority set of a plurality of unannotated images which are in the target domain and having the second image style;
performing an image style transfer from the source domain to the target domain by converting the plurality of object annotated images in the source domain from having the first image style into having the second image style to generate a converted set of object annotated images having the second image style;

training a pseudo-labeler with supervised training based on the converted set of object annotated images having the second image style and the minority set of the object annotated images in the second image style;

generating, by the pseudo-labeler, object annotation for the majority set of the plurality of unannotated images in the second image style to change from the majority set of a plurality of unannotated images into a majority set of a plurality of annotated images; and performing an active domain adaptation by adapting the minority set of a plurality of object annotated images, the converted set of object annotated images, and the majority set of the plurality of annotated images so as to generate an object detection model.

\* \* \* \* \*